(12) United States Patent
Miller

(10) Patent No.: US 8,296,851 B1
(45) Date of Patent: Oct. 23, 2012

(54) SYSTEM AND METHOD FOR ENSURING SECURITY OF DATA STORED ON ELECTRONIC COMPUTING DEVICES

(76) Inventor: Timothy T. Miller, Columbus, OH (US)

( * ) Notice: Subject to any disclaimer, the term of this patent is extended or adjusted under 35 U.S.C. 154(b) by 0 days.

(21) Appl. No.: 13/084,838

(22) Filed: Apr. 12, 2011

Related U.S. Application Data

(63) Continuation of application No. 11/967,305, filed on Dec. 31, 2007, now Pat. No. 7,930,755.

(60) Provisional application No. 60/985,077, filed on Nov. 2, 2007.

(51) Int. Cl.
 *H04L 29/06* (2006.01)
 *H04L 9/00* (2006.01)
(52) U.S. Cl. ............... 726/26; 726/27; 726/28; 726/29; 726/30; 713/182; 713/183; 713/184; 713/185
(58) Field of Classification Search ...................... 726/26
 See application file for complete search history.

(56) References Cited

U.S. PATENT DOCUMENTS

| 7,543,144 B2 | 6/2009 | Rensin et al. | |
|---|---|---|---|
| 2006/0021007 A1* | 1/2006 | Rensin et al. | 726/2 |
| 2008/0147799 A1 | 6/2008 | Morris | |
| 2008/0219436 A1 | 9/2008 | Chen et al. | |

* cited by examiner

*Primary Examiner* — Longbit Chai
(74) *Attorney, Agent, or Firm* — Standley Law Group LLP

(57) ABSTRACT

A system and method for using a host electronic computing device to prevent access to data in a preselected memory portion of an electronic computing device remote from the host electronic computing device. Each of the electronic computing devices is adapted for selective electronic communication with the other. The system and method comprises a first software program for the remote device, the first software program comprising a unique identifier, a current expiration time value, a comparator for comparing the current expiration time value against a time-based parameter of the remote device, and a security trigger. The system and method further comprises a second software program for the host device, where the second software program includes means for identifying the remote device, means for accessing an expiration time reset schedule, and means for resetting the current expiration time value.

20 Claims, 4 Drawing Sheets

| Day of the Week | Time by Which Self-Cannibalizing Software Must be Reset | Time to Which Expiration Time is Reset |
|---|---|---|
| Monday | No Reset Required | Expiration Time is Not Reset |
| Tuesday | 5:30 PM | Expiration Time is Reset to Wednesday at 5:30 PM |
| Wednesday | 5:30 PM | Expiration Time is Reset to Thursday at 5:30 PM |
| Thursday | 5:30 PM | Expiration Time is Reset to Friday at 5:30 PM |
| Friday | 5:30 PM | Expiration Time is Reset to Saturday at 5:30 PM |
| Saturday | 5:30 PM | Expiration Time is Reset to Monday at 5:30 PM |
| Sunday | No Reset Required | Expiration Time is Not Reset |

FIG-2

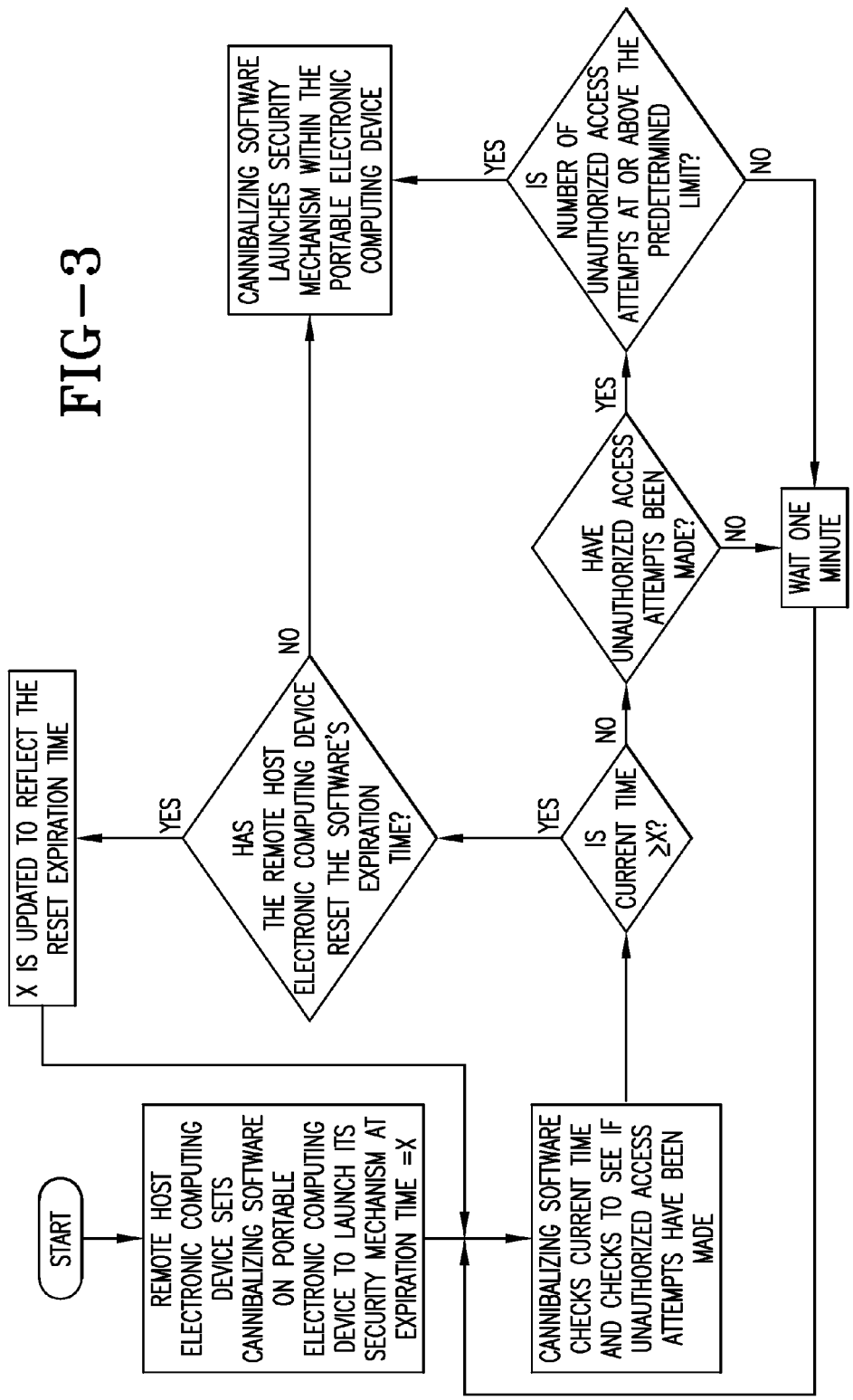

SYSTEM AND METHOD FOR ENSURING SECURITY OF DATA STORED ON ELECTRONIC COMPUTING DEVICES

CROSS REFERENCE TO RELATED APPLICATIONS

This application is a continuation of U.S. patent application Ser. No. 11/967,305, filed on Dec. 31, 2007, which claims the benefit of U.S. Provisional Patent Application No. 60/985,077, filed on Nov. 2, 2007, both of which are hereby incorporated by reference in their entirety.

TECHNICAL FIELD

Exemplary embodiments of the present system and method relate to security for data stored on electronic computing devices, such as portable "laptop" computers, personal digital assistants, portable cellular phones, etc. More particularly, exemplary embodiments of the present invention relate to a system and method for securing electronic data stored within the memories, hard drives, etc. of electronic computing devices through the use of self cannibalizing software.

BACKGROUND AND SUMMARY OF THE INVENTION

In recent history, portable electronic computing devices have increasingly become an essential tool for capturing, recording, calculating, computing, manipulating, and storing electronic data within the computer industry. Many portable electronic computing devices, for example, current day laptop computers, personal digital assistants, and portable cell phones, provide owners, authorized operators or users with a powerful, portable workspace having capacity for software and hardware technology that equals, or in some cases surpasses, that of non-portable electronic computing devices, such as desktop computers.

Portable electronic computing devices allow for connectivity outside of the host office setting, utilizing local area networks, wide area networks, or other networks—hardwired, wireless, or otherwise. This allows many people the opportunity to take their electronic workspace with them when they find need to travel or work from a remote site. Unfortunately, the mobility that makes portable electronic computing devices so valuable also renders them vulnerable and susceptible to theft. Some have estimated that more than 600,000 laptop computers are stolen in the United States each year. The theft of laptops generates losses of over $750 million annually. Even more alarming, however, is the statistic reporting that the theft of the same 600,000 laptops results in an average loss of $5.4 billion in proprietary and/or confidential information contained in electronic data files that thieves are able to remove from the stolen laptops. Additional annual loss comes from the theft of data that has been stored on alternative types of portable electronic computing devices such as PDA's. Recent thefts of confidential and propriety information, consisting of social security numbers, credit card information, and other personal financial data from stolen corporate and government-owned portable computers, have left thousands at risk for identity theft and the corporate and government entities responsible for such breaches of security potentially liable for untold damages.

While mobility makes portable electronic computing devices vulnerable to theft, it also makes business owners of portable electronic computing devices who issue them to employees vulnerable to the consequences resulting from an inability to locate, inventory, secure, and recover electronic data generated by and stored on portable electronic computing devices issued to employees. This inability to locate, inventory, secure, and recover electronic data stored on portable electronic computing devices issued to employees has recently manifested itself in terms of potential liability that can result from failure to produce documentation contained on electronic computing devices in response to litigation discovery requests in Federal and state courts. New discovery rules issued by Federal and state courts impose harsh penalties—and in some cases practically insurmountable burdens of proof—upon litigants unable to produce electronic data stored on portable electronic computing devices.

The known art has recognized the need for a system that provides protection to portable electronic computing device owners, authorized operators, or users against theft. Many systems of the known art require those who wish to access the proprietary or confidential information stored on a portable electronic computing device to enter a password when prompted, the password having been predetermined by the portable electronic computing device owner, its authorized operator, user, or system administrator. If the correct password is not entered, the system does not allow access to the portable computer's data. Theoretically and ideally, only those authorized to access the computer's electronic data files are aware of the system's password. Unfortunately, it is possible to circumvent passwords by trial and error, use of specialized software, or other methods of entry. Thieves can now determine or "password hack" into a password secured portable electronic computing device over a period of a few hours, days, or weeks depending upon their level of sophistication. Upon doing so such thieves are then able to access the electronic data stored on the portable electronic computing device and thereby gain possession of proprietary and/or confidential information stored on the stolen portable electronic computing device.

The known art has also attempted to protect the proprietary or confidential information stored on portable electronic computing devices by lock and key technology. In these systems, a portable electronic computing device owner, authorized operator or user who wishes to gain access to the portable electronic computing device's proprietary information must first place a key into a receiving body located on the portable electronic computing device. Only with the key in place will the portable electronic computing device operate. The shortcoming of these systems is that because the portable electronic computing devices will not operate without the keys in place, thieves often times find the keys still located within the computers, or conveniently nearby, thus breaching security.

The known art has also attempted to protect the proprietary and/or confidential information stored on portable electronic computing devices by providing systems which seek to physically deter theft of the device itself, and thereby the electronic data stored on the device. For example, security cables have been developed which allow owners, authorized operators or users of portable computers to secure their portable devices to a desired surface. The typical computer cable works by having one end fastened to the portable computer and the other end attached to the work surface being utilized by the computer owner. This form of security is based upon the premise that often thieves steal laptops in order to gain access to the portable computer itself and only take advantage of the proprietary and/or confidential data stored on the computer as an afterthought because it is available and accessible. The theory is that by making theft of the computer more difficult you thereby reduce the possibility that the electronic data on the computer will be compromised. Metal laptop cases which secure portable computers and are then locked in place with a key are another example of a physical method of electronic data protection. Laptop alarm systems, which function by sounding an alarm when a portable computer has been moved from a sedentary position, have also been developed. The inherent problem with all of these systems, which are based upon making the portable electronic computing devices physically inaccessible, is that they eliminate the most attractive feature of the portable electronic computing device, that being its mobility. Additionally, if a thief is only after the confidential or proprietary information on the portable electronic computing device and not the computer itself, it will be possible in many instances for a thief to download and access electronic data from an unattended portable electronic computer onto a disk or other portable electronic data storage vessel.

Systems exist in the known art which aim to protect portable electronic computing devices owners, authorized operators or users from theft by rendering the data stored on portable computers inaccessible. These systems of the known art use software that has been installed on portable computers that allows the computers to be located after they have been stolen, but only if and when the portable electronic computing device has been used to access the internet. The computers must be located on the internet before the system can render the data stored within the portable computer inaccessible. The problem with an internet alert based security system is it requires the portable electronic computing device to access the internet before the device can be tracked and the electronic data rendered inaccessible. Additionally, the owner, authorized operator or user of the portable electronic computing device bears the responsibility for timely reporting the device as being stolen before the system will initiate internet based tracking. The thief of an internet alert based system can potentially access the electronic data stored on a stolen portable electronic computing device without disruption so long as the device is not used to access the internet. This can give a portable electronic computing device thief ample time in which to access confidential and/or proprietary electronic data stored on the device.

The inherent weakness in the security systems in the known art is that the electronic data stored on stolen or misplaced portable electronic computing devices can and often does remain intact and vulnerable to breach for an unlimited period of time. Consequently, portable electronic computing device owners, authorized operators, or users remain at constant risk that proprietary or confidential information stored on their devices will be compromised in the event of theft or misplacement of the devices. In those instances in which the proprietary or confidential information consists of personal financial information, such as social security, credit card, and financial account numbers, the portable electronic computing device owners also remain at constant risk for the potential imposition of substantial legal liability that could result if such stolen personal financial information is used to perpetrate identity theft and fraud upon those whose sensitive data was stored on the portable electronic computing device.

In light of the foregoing problems with the systems of the known art, there is a need for a more effective method and system for protecting electronic data stored within portable electronic computing devices in the event that the devices are stolen, misplaced, etc. While the disclosed system and method is ideal for securing the data stored on portable electronic computing devices, it may also be used to secure data on many electronic computing devices which are not portable. Generally, an exemplary embodiment of the system and method of the present invention protects electronic data stored within electronic computing devices through the use of self-cannibalizing software that operates independently of the electronic computing device owner, authorized operator or user and automatically in accordance with a preset expiration time. The self-cannibalizing software, once installed on a computing device, is capable of causing the launch of a security mechanism within the physical confines and operating system of the electronic computing device. Once launched, the security mechanism secures some or all of the existing electronic data files of the electronic computing device using interactive program code. The interactive program code utilized by the security mechanism may vary depending on how electronic data is stored on an electronic computing device. Additionally, there are a variety of ways that a launched security mechanism may secure the electronic data stored on an electronic computing device depending on the needs, resources, etc. of the owner, authorized operator or user of the electronic computing device.

In an exemplary embodiment of the disclosed system and method, an electronic computing device, remote from a host electronic computing device, is equipped with self-cannibalizing software that is configured with computer readable program code capable of identifying a preset expiration time and automatically causing the launch of a security mechanism at the preset expiration time. In order to prevent the automatic launching of the security mechanism, the owner, authorized operator or user of the remote electronic computing device must electronically log the remote electronic computing device into, synch it up with, or use it to access the authorized password-protected host electronic computing device prior to the preset expiration time. In doing so, complementary administrative software on the password-protected host electronic computing device will automatically reset the expiration time on the remote electronic computing device consistent with predetermined expiration time parameters previously authorized by the system administrator. When the expiration time for the self-cannibalizing software is reset, a new expiration period commences that must pass before it will cause security mechanism to be automatically launched. When the expiration time of the self-cannibalizing software on the remote electronic computing device is not reset by electronically logging into, synching up with, or accessing the authorized password-protected host electronic computing device, the last set expiration time will dictate the automatic launching of the security mechanism.

In an exemplary embodiment, an electronic computing device, is equipped with self-cannibalizing software that is configured with electronic computing device readable program code capable of identifying when an operator has attempted to enter an incorrect password a predetermined number of times within a predetermined time span or when an unauthorized operator or user is attempting to use "password hacking" software. If the unauthorized operator or user of the remote electronic computing device equipped with self-cannibalizing software attempts to enter an incorrect password the predetermined number of times within the predetermined time span or the operator attempts to use "password hacking" software the self-cannibalizing software will automatically cause the launch of a security mechanism within the electronic computing device.

An exemplary disclosed system and method may force an electronic computing device owner, authorized operator or user to be more diligent in securing electronic computing devices by requiring the devices be used to electronically log into, synch up with, or access a password protected host electronic computing device on a periodic basis in order to reset the electronic computing device's self-cannibalizing software. While the disclosed system and method may increase the awareness of the owner, authorized operator or user of an electronic computing device in regards to the whereabouts of the electronic computing device, the system and method may protect an electronic computing device even if the owner, authorized operator or user is unaware the electronic computing device has become the victim of a theft or fails to timely report the theft. Additionally, if an electronic computing device has been stolen, the disclosed system and method may prevent the electronic data stored within the electronic computing device from being accessed, altered, amended, computed, displayed, manipulated, printed, processed, read, replicated, retrieved, restored, transferred, and transmitted, etc., regardless of whether or not the responsible thief uses the device to access the internet.

In addition to the novel features and advantages mentioned above, other benefits will be readily apparent from the following descriptions of the drawings and exemplary embodiments.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical characters refer to identical parts and in which:

FIG. 2 is an exemplary embodiment of a predetermined expiration time reset schedule for an electronic computing device.

FIG. 3 is a flow chart showing an exemplary embodiment of how self-cannibalizing software determines when to automatically cause the launch of a security mechanism within an electronic computing device.

DETAILED DESCRIPTION OF EXEMPLARY EMBODIMENT(S)

An exemplary embodiment of the disclosed system and method utilizes a host electronic computing device to prevent access to data in a preselected memory portion of an electronic computing device, remote from the host electronic computing device. The remote electronic computing device and the host electronic computing device are each adapted for selective electronic communicating with the other. The remote electronic computing device is loaded with self-cannibalizing software while the host electronic computing device is loaded with complimentary administrative software. In an exemplary embodiment, the disclosed system and method requires that the remote electronic computing device, electronically log into, synch up with, or access a predetermined, password-protected, authorized connection to the host electronic computing device, in order to reset the current expiration time of the self-cannibalizing software. Self-cannibalizing software is software that may be installed on an electronic computing device and configured to cause the launch of a security mechanism within the computing device when certain conditions are met. The security mechanism launched by self-cannibalizing software may vary depending on a variety of factors. The complimentary administrative software of the host electronic computing device is software that enables the host electronic computing device to electronically communicate with and reset the self-cannibalizing software stored on the remote electronic computing device when the remote electronic computing device logs into, synchs up with, or accesses the host electronic computing device. In some exemplary embodiments the complimentary administrative software of the host electronic computing device is capable of additional functions. For purposes of describing the disclosed system and method the term "expiration time" will be defined as the time by which the self-cannibalizing software stored on the remote electronic computing device must be reset in order to prevent the self-cannibalizing software from causing the launch of a security mechanism within the computing device. Resetting the expiration time of the remote electronic computing device's self-cannibalizing software alters the time at which the self-cannibalizing software is scheduled to automatically cause the launch of the security mechanism. In a preferred embodiment of the present system, the remote electronic computing device logs into, synchs up with, or accesses the host electronic computing device, in order to have the expiration time of its software reset, via a local area network, wide area network, or other electronic network—wireless or otherwise.

Figure 1:
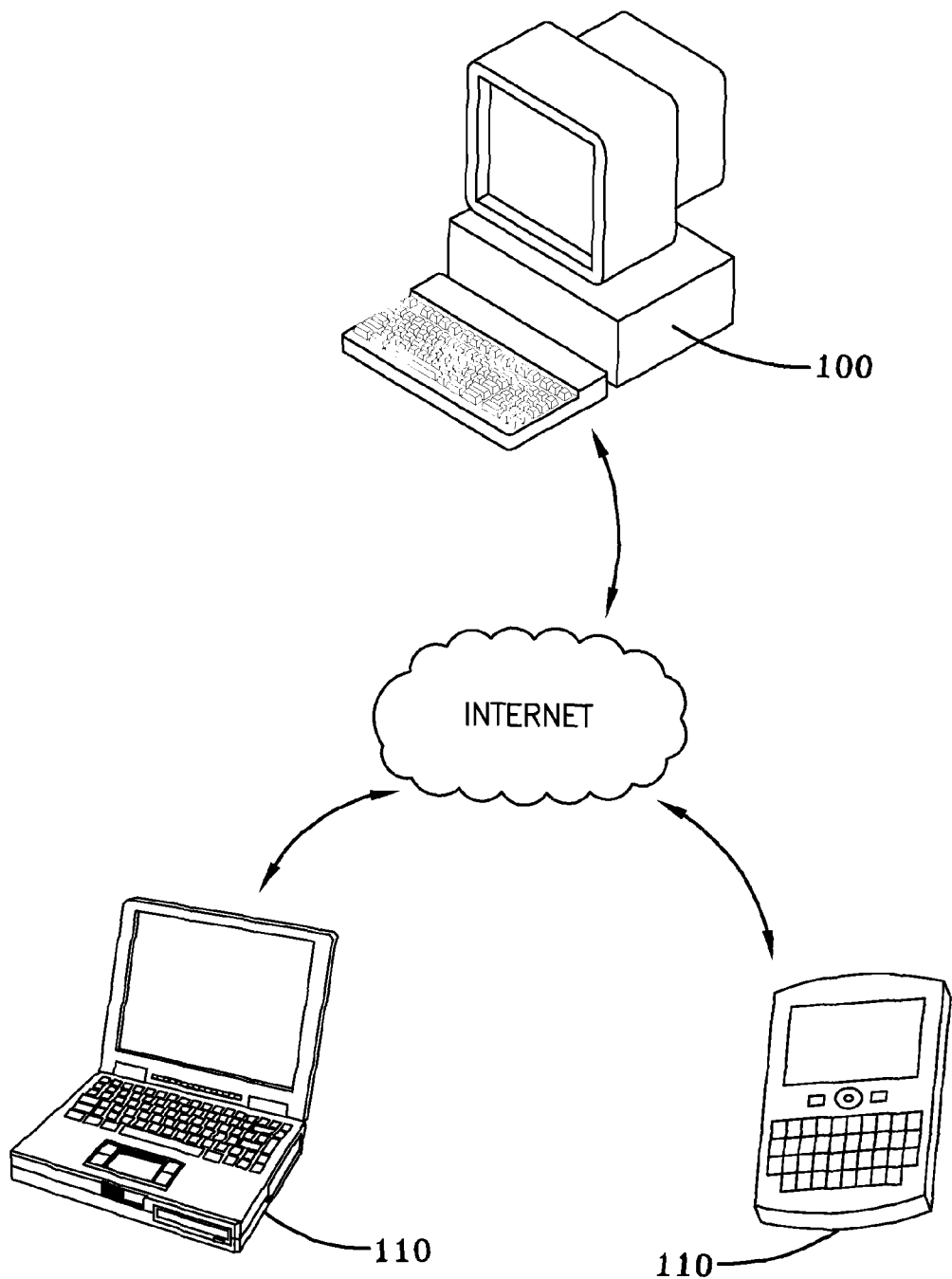
FIG. 1 is an exemplary embodiment of the overall structure of the system and method.

FIG. 1 shows an exemplary embodiment of the overall structure of the disclosed system and method. A host electronic computing device 100 containing complimentary administrative software is maintained which permits electronic log-ins, synch ups, or access by a remote electronic computing device 110. The log-ins, synch ups, or access by the remote electronic computing device 110 to the host electronic computing device 100 may be carried out in a variety of ways—it is not necessary that the remote electronic computing device 110 access the internet, but accessing the internet is one possible means as shown in this exemplary embodiment. The remote electronic computing device 110 is loaded with self-cannibalizing software that is configured with program code to automatically cause the launch of a security mechanism within the remote electronic computing device 110 at a preset expiration time. When the host electronic computing device 100 detects the log-in, synch up, or access of the remote electronic computing device 110 the host electronic computing device 100 interrogates the remote electronic computing device 100. The complimentary administrative software loaded into the host electronic computing device 100 comprises program code for resetting the expiration time of the self-cannibalizing software of the remote electronic computing device 110. Once the remote electronic computing device 110 electronically logs into, synchs up with, or accesses the host electronic computing device 100 the program code of the complimentary administrative software residing on the host electronic computing device 100 resets the expiration time of the self-cannibalizing software residing on the remote electronic computing device 110. Self-cannibalizing software may be either embedded as a hard coded chip within an electronic computing device 110 or installed separately in an aftermarket fashion. For purposes of the disclosed system and method an electronic computing device 110 includes but is not limited to a laptop computer, desktop computer, PDA, cell phone, etc.

In an exemplary embodiment of the disclosed system and method, self-cannibalizing software is installed on a remote electronic computing device 110 that utilizes a current operating system such as Microsoft Windows, Apple Mac, OS, Unix, and Linux. The self-cannibalizing software is configured such that it will automatically cause the launch of a security mechanism within the remote electronic computing device 110 at a preset expiration time. The security mechanism may be part of the self-cannibalizing software, but it may also be supplied by different software, etc. stored within the remote electronic computing device 110. By using the remote electronic computing device 110 to electronically log into, synch up with, or access the host electronic computing device 100 the owner, authorized operator or user of the remote electronic computing device 110 may cause the complimentary administrative software of the host electronic computing device 100 to reset the expiration time of the self-cannibalizing software. When the expiration time of the self-cannibalizing software is reset the automatic launch of the security mechanism may be delayed until the reset expiration time.

In an exemplary embodiment of the disclosed system and method a schedule is predetermined by which the expiration time of the self-cannibalizing software of the remote electronic computing device 110 is to be set and reset. FIG. 2 is an exemplary embodiment of a predetermined expiration time reset schedule for a remote electronic computing device 110. The schedule may control when the expiration time of the self-cannibalizing software must be reset in order to prevent the self-cannibalizing software from causing the automatic launch of the security mechanism. The expiration time reset schedule may be devised by the owner, authorized operator or user of the remote electronic computing device 110 and then communicated to the host electronic computing device 100. Alternatively, the expiration time reset schedule may be devised by the host electronic computing device 100 automatically or by its administrator. In a preferred exemplary embodiment, the host electronic computing device 100 is able to access the reset schedule of the remote electronic computing device 110 and use the data of the schedule to properly reset the expiration time of the remote electronic computing device's self-cannibalizing software. The host electronic computing device 100 may require that multiple remote electronic computing devices 110 follow a single expiration time reset schedule or the host electronic computing device 100 may permit multiple remote electronic computing devices 110 to follow different reset schedules.

In an exemplary embodiment of the disclosed system and method a predetermined expiration time reset schedule has established the time by which the remote electronic computing device 110 must electronically log into, synch up with, or access the host electronic computing device 100. The schedule is accessible by the host electronic computing device 100. When the remote electronic computing device 110 logs into, synchs up with, or accesses the host electronic computing device 100 the host electronic computing device 100 communicates the expiration time to the self-cannibalizing software stored on the remote electronic computing device 110. Having had an expiration time communicated to it, the self-cannibalizing software stored on the remote electronic computing device 110 is now able to keep track of that expiration time. In one exemplary embodiment, the self-cannibalizing software keeps track of the expiration time by having been given a certain date and time by which it must be reset in order to prevent causing the automatic launch of a security mechanism. For example, when a remote electronic computing device 110 logs into, synchs up with, or accesses a host electronic computing device 100 the host electronic computing device 100 may communicate to the self-cannibalizing software stored on the remote electronic computing device 110 that its expiration time will occur at 9 PM Eastern Standard Time on Aug. 27, 2007. From that point, the self-cannibalizing software may monitor the date and time and determine when it is 9 PM Eastern Standard Time on Aug. 27, 2007 and if the self-cannibalizing software has not been reset—it will automatically cause the launch of a security mechanism. In another exemplary embodiment, the self-cannibalizing software stored on a remote electronic computing device 110 keeps track of the current expiration time by monitoring the passage of time in relationship to an allotted time period. For example, when a remote electronic computing device 110 logs into, synchs up with, or accesses a host electronic computing device 100 the host electronic computing device 100 may communicate to the self-cannibalizing software stored on the remote electronic computing device 110 that its expiration time will occur in 24 hours. From that point, the self-cannibalizing software may monitor the passage of time and determine when the 24 hour time period has passed and if the expiration time has not been reset, automatically cause the launch of a security mechanism within the remote electronic computing device 110.

In an exemplary embodiment, the self-cannibalizing software stored on a remote electronic computing device 110 references the date and time as recorded by the calendar and/or clock functions of the remote electronic computing device 110 in order to monitor its expiration time. The self-cannibalizing software, other software or program, etc. stored on the remote electronic computing device 110 may place limitations on the ability to alter the date and time as recorded by the calendar and clock functions of the remote electronic computing device 110. For example, a program stored on a remote electronic computing device 110 may require that a password be entered before the date and time recorded by the remote electronic computing device 110 may be changed. In another exemplary embodiment, the date and time recorded by the remote electronic computing device 110 may only be altered by the host electronic computing device 100.

In an exemplary embodiment of the disclosed system and method a predetermined expiration time reset schedule sets expiration times for the self-cannibalizing software contained on the remote electronic computing device 110 that will require the owner, authorized operator or user of the remote electronic computing device 110 to electronically log into, synch up with, or access the host electronic computing device 100 to reset the current expiration time to the next expiration time and thereby delay the self-cannibalizing software from automatically causing the launch of a security mechanism. In a preferred exemplary embodiment a predetermined expiration time reset schedule sets expiration times in 24 hour intervals such that the remote electronic computing device 110 must electronically log into, synch up with, or access the host electronic computing device 100 at least once every 24 hours in order to reset the expiration time. In another exemplary embodiment of the disclosed system and method, the expiration time of the self-cannibalizing software of the remote electronic computing device 110 must be reset using time intervals greater or less than 24 hours. In another exemplary embodiment, a predetermined reset schedule may be altered after it has been communicated to the host electronic computing device 100. Additionally, the host electronic computing device 100 may be able to replace an existing predetermined expiration time reset schedule with a new schedule.

In an exemplary embodiment of the disclosed system and method, an expiration time reset schedule consists of multiple expiration times separated by equal and unequal intervals of time. For example, a weekly reset schedule for the expiration times of self-cannibalizing software of the remote electronic computing device 110 may consist of five 24 hour expiration time intervals and one 48 hour expiration time interval such that the owner, authorized user or operator of the remote electronic computing device 110 must reset the expiration time of the self-cannibalizing software on his or her remote electronic computing device 110 once each weekday but only be required to do so once over the weekend. In another exemplary embodiment, an expiration time reset schedule consists of equal expiration time intervals. In one exemplary embodiment, the expiration time reset schedule is determined at the beginning of each week by the owner, authorized operator or user of the remote electronic computing device 110 so that the expiration time reset schedule may conform to a given week's itinerary. In another exemplary embodiment, an expiration time reset schedule is set and remains in place until it is changed by the remote electronic computing device owner, authorized operator or user, or by the host electronic computing device 100 or its administrator. An expiration time reset schedule may be repetitive and/or cyclical such that the self-cannibalizing software of a remote electronic computing device 110 follows the same reset schedule each day, week, month, etc. An expiration time reset schedule may contain only a single expiration time. An expiration time reset schedule may exist in the mind of the administrator of the host electronic computing device 100 and does not have to exist in electronic form before it is communicated to the host electronic computing device 100.

In an exemplary embodiment of the present system and method the host electronic computing device 100 accesses a predetermined expiration time reset schedule for the remote electronic computing device 110 and is able to reset the expiration time of the device's self-cannibalizing software to the next sequential expiration time as defined by the expiration time reset schedule when the remote electronic computing device 110 electronically logs into, synchs up with, or accesses the host electronic computing device 100. In one exemplary embodiment of the disclosed system and method, a password protected internet-based website acts as the connection to the host electronic computing device 100 and the remote electronic computing device 110 may electronically log into, synch up with, or access the internet web site by accessing the internet and going to the web site's internet address. Once the remote electronic computing device 110 has electronically logged into, synched up with, or accessed the host electronic computing device 100 the program code of the host electronic computing device 100 may identify the remote electronic computing device 110, access its self-cannibalizing software, and reset the then current expiration time of the self-cannibalizing software of the remote electronic computing device 110. In another exemplary embodiment, access to the host electronic computing device 100 by the remote electronic computing device 110 is accomplished through a local area network, wide area network or other networks, hardwired, wireless or otherwise. A variety of configurations may create a host electronic computing device 100 for the purposes of practicing the disclosed system and method.

In an exemplary embodiment, the disclosed system and method is used in conjunction with a security system such as of the known art. For example, a remote electronic computing device owner, authorized operator or user may be required to enter a password before being granted access to the database of their remote electronic computing device 110 as well as be required to electronically log into, synch up with, or access a host electronic computing device 100 with their remote electronic computing device 110 in order to reset the device's self-cannibalizing software. Password protection may take on a variety of forms including, but not limited to, alphanumeric key strokes, finger print recognition, voice recognition, retinal scan recognition, and electronic magnetic card recognition—all of these forms are appropriate for incorporation into an exemplary embodiment of the presently disclosed system as well as a system working in conjunction with an exemplary embodiment of the presently disclosed system. A remote electronic computing device owner, authorized operator or user may similarly have to insert a key into a receiving body located on the remote electronic computing device 110 before the remote electronic computing device 110 will operate as well as be required to electronically log into, synch up with or access a host electronic computing device 100 with the remote electronic computing device 110 in order to reset the self-cannibalizing software 110.

In one exemplary embodiment, when the disclosed system and method is used in conjunction with a security system such as of the known art that operates using password-based technology, it may reduce the amount of time and opportunity a thief of a remote electronic computing device 110 has to determine the passwords which might otherwise grant access to the electronic computing device's proprietary and/or confidential information. If the thief is unable to immediately determine the system's predetermined, authorized password and either makes a predetermined number of repeated attempts to input an incorrect password or makes a predetermined number of repeated efforts to access and obtain, manually or electronically, the remote electronic computing device's predetermined, authorized password, then the self-cannibalizing software of the remote electronic computing device 110 will automatically cause the launch of a security mechanism within the remote device 110.

In another exemplary embodiment of the current system and method, the remote electronic computing device 110 is unable to electronically log into, synch up with, or access the host electronic computing device 100 resulting in the expiration time of the self-cannibalizing software of the remote electronic computing device 110 not being reset. In some exemplary embodiments, the inability to access the host electronic computing device 100 is caused by the theft of the remote electronic computing device 110. In other exemplary embodiments the inability to access the host electronic computing device 100 may be caused by loss of the remote computing device 110, a desire to avoid accessing the host 100, etc. When the current expiration time of the self-cannibalizing software goes unaltered because the remote electronic computing device 110 is unable to access the host electronic computing device 100, the self-cannibalizing software residing on the remote electronic computing device 110 will automatically cause the launch of a security mechanism when it detects that the current expiration time has been reached. Once automatically launched, program code of the security mechanism residing on the remote electronic computing device 110 may prevent data contained on the remote electronic computing device 110 from being accessed, altered, amended, computed, displayed, manipulated, printed, processed, read, replicated, retrieved, restored, transferred and transmitted, etc. In an exemplary embodiment of the current system and method, where the remote electronic computing device 110 is unable to access the host electronic computing device 100 because the remote electronic computing device 110 has been stolen, a thief is able to maintain possession of the stolen electronic computing device 110, but because the security mechanism has been automatically launched by the self-cannibalizing software at the expiration time, the thief is unable to access electronic data files stored within the remote electronic computing device 110.

The host electronic computing device 100 of the disclosed system and method comprises complimentary administrative software containing program code capable of resetting the expiration time of self-cannibalizing software residing on the remote electronic computing device 110. In a preferred embodiment of the disclosed system and method the resetting means of the program code is electronic. In another exemplary embodiment, the resetting means incorporates both electronic and human supplied components. For example, a host electronic computing device 100 containing complimentary administrative software may allow electronic log in, synch up, or access by a remote electronic computing device 110 and identify which remote electronic computing device 110 has just logged-in, etc. A human participant may then access the expiration time reset schedule for the particular remote electronic computing device 110 and cause the self-cannibalizing software of the remote electronic computing device 110 to be correctly reset.

In an exemplary embodiment of the disclosed system and method, the remote electronic computing device 110 is not used to electronically log into, synch up with, or access the host electronic computing device 100 before the expiration time has been reached. The self-cannibalizing software residing on the remote electronic computing device 110 recognizes the passage of the expiration time and automatically causes the launch of a security mechanism. In another exemplary embodiment the remote electronic computing device 110 is automatically turned off at or before the expiration time. Once the remote electronic computing device 110 is thereafter turned on, the self-cannibalizing software residing on the remote electronic computing device 110 detects that its expiration time was not reset within the allotted time and automatically causes the launch of a security mechanism.

In one exemplary embodiment the self-cannibalizing software stored on the remote electronic computing device 110 may automatically cause the launch of a security mechanism in either of two instances. The first instance in which the self-cannibalizing software may automatically cause the launch of a security mechanism is when either repeated efforts are made to input an incorrect password or repeated efforts are made to access and obtain, manually or electronically, the remote electronic computing device's predetermined, authorized password. The second instance in which the self-cannibalizing software may automatically cause the launch of a security mechanism is when the self-cannibalizing software's predetermined expiration time is not voluntarily reset in a pre-selected, timely fashion by electronically logging into, synching up with, or accessing the host electronic computing device 100. FIG. 3 is a flow chart showing an exemplary embodiment of how self-cannibalizing software determines when to cause the launch of a security mechanism within a remote electronic computing device 110 when it may automatically cause the launch of a security mechanism in either one of two instances.

In an exemplary embodiment of the disclosed system and method, the self-cannibalizing software of the remote electronic computing device 110 is configured to automatically cause the launch of a security mechanism that produces semi-permanent results. Once the semi-permanent security mechanism is automatically launched within the remote electronic computing device 110, the security mechanism prevents data contained on the portable electronic computing device 110 from being accessed, altered, amended, computed, displayed, manipulated, printed, processed, read, replicated, retrieved, restored, transferred and transmitted, etc. but only until the remote electronic computing device 110 is later used to electronically log into, synch up with, or access the host electronic computing device 100. Once the remote electronic computing device 110 is used to electronically log into, synch up with, or access the host electronic computing device 100 the reversing means of the host electronic computing device 100 causes the results that were produced by the automatic launch of the security mechanism to be reversed and additionally resets the self-cannibalizing software of the remote electronic computing device 110.

Self-cannibalizing software may utilize a variety of security mechanisms in order to protect electronic data stored on an electronic computing device 110. In one exemplary embodiment, the security mechanism of the self-cannibalizing software residing on the remote electronic computing device 110 renders the electronic data contained on the device inaccessible by directly disabling, temporarily or permanently, in whole or in part, selective operating systems residing on the remote electronic computing device 110 that are necessary to operate the remote electronic computing device 110 and/or access, alter, amend, compute, display, manipulate, print, process, read, replicate, retrieve, restore, transfer and transmit, etc., electronic data files stored on the remote electronic computing device 110. These operating systems may include, but are not limited to, the task scheduler, memory manager, disk manager, and network manager, whether such operating systems are contained on a hard coded chip within the remote electronic computing device 110 or were installed separately in an aftermarket fashion. In one exemplary embodiment, previously selected operational systems of the remote electronic computing device 110 are left in tact even when the launch of a security mechanism has left other systems residing on the remote electronic computing device 110 disabled. For example, the automatic launch of the security mechanism may leave unaffected the operational systems residing on the remote electronic computing device 110 that are related to electronically logging into, synching up with, or accessing the host electronic computing device 100.

In one exemplary embodiment of the current system and method the automatic launch of the security mechanism does not affect the systems of the remote electronic computing device 110 that are related to accessing the host electronic computing device 100. In this exemplary embodiment the remote electronic computing device 110 may log into, synch up with, or access the host electronic computing device 100 even after the self-cannibalizing software has caused the launched of the security mechanism. The host electronic computing device 100 may be equipped with program code capable of restoring the selectively disabled operating systems of the remote electronic computing device 110 when it electronically logs into, synchs up with, or accesses the host electronic computing device 100.

In another exemplary embodiment, the security mechanism launched by the self-cannibalizing software residing on the remote electronic computing device 110 indirectly disables, temporarily or permanently, in whole or in part, selective operating systems residing on the remote electronic computing device 110 by initiating replicating program code to create benign data files in such numerous quantities that the benign files consume and utilize available random access memory, serial access memory, and other memory storage otherwise needed by selective operating systems of the remote electronic computing device 110 to perform basic operational functions associated with accessing, altering, amending, computing, displaying, manipulating, printing, processing, reading, replicating, retrieving, restoring, transferring and transmitting, etc., electronic data files stored on the remote electronic computing device 110. In one exemplary embodiment, operational functions of the remote electronic computing device 110 related to electronically logging into, synching up with, or accessing the host electronic computing device 100 are left in tact and the complimentary administrative software residing on the host electronic computing device 100 has program code capable of restoring the selectively dismantled operating systems of the remote electronic computing device 110 by deleting the benign files created by the replicating program code of the launched security mechanism.

In one exemplary embodiment of the disclosed system and method, the security mechanism of the self-cannibalizing software residing on the remote electronic computing device 110 indirectly renders electronic data stored on the remote electronic computing device 110 inaccessible by deleting the data, temporarily or permanently, in whole or in part. If deletion is the manner by which electronic data stored within a remote electronic computing device 110 is rendered inaccessible by the security mechanism, the owner, authorized operator or user of the remote electronic computing device 110 may chose to backup the electronic data stored on the remote electronic computing device 110 by saving it remotely. In one exemplary embodiment, the owner, authorized operator or user of the remote electronic computing device 110 may chose to backup the electronic data stored on the remote electronic computing device 110 by saving it within an electronic database located on the host electronic computing device 100 each time the owner, authorized operator, or user electronically logs into, synchs up with, or accesses the host electronic computing device 100 to reset the expiration time on the remote electronic computing device 110.

In one exemplary embodiment, the security mechanism of the self-cannibalizing software residing on the remote electronic computing device 110 directly renders electronic data stored on the remote electronic computing device 110 inaccessible by corrupting the data, temporarily or permanently, in whole or in part. In one exemplary embodiment, electronic data files stored on the remote electronic computing device 110 are corrupted by the random or systematic addition of corrupting computer bytes to each data file or deletion of individual bytes from each data file. In one exemplary embodiment where electronic data files contained on the remote electronic computing device 110 have been systematically corrupted as a result of the self-cannibalizing software contained on the remote electronic computing device 110 having automatically launched its security mechanism, the corrupted electronic data may be restored by electronically logging into, synching up with, or accessing the host electronic computing device 100 equipped with complimentary administrative software.

In another exemplary embodiment, the security mechanism of the remote electronic computing device's self-cannibalizing software causes electronic data stored on the remote electronic computing device 110 to be quarantined until a later time. The data may be quarantined by transferring it to an authorized password-protected, secured location within the memory of the remote electronic computing device 110 that cannot be accessed through use of the remote electronic computing device 110, etc. In another exemplary embodiment, once the security mechanism of the remote electronic computing device 110 has quarantined electronic data stored within the remote electronic computing device 110, that electronic data may only be accessed through use of an electronic computing device 110 that has been equipped with complimentary administrative software. Likewise, in the case of a cannibalized remote electronic computing device 110 (a remote electronic computing device 110 whose self-cannibalizing software has automatically caused the launched of a security mechanism), depending upon the owner's, authorized operator's or user's preferences and selection of security mode, assuming user did not opt for total destruction or corruption of data files, the self-cannibalizing software may be set to reauthorize access, alter, amend, compute, display, manipulate, print, process, read, replicate, retrieve, store, transfer and transmit data files via a different remote electronic computing device 110 containing self-cannibalizing software.

Figure 4:
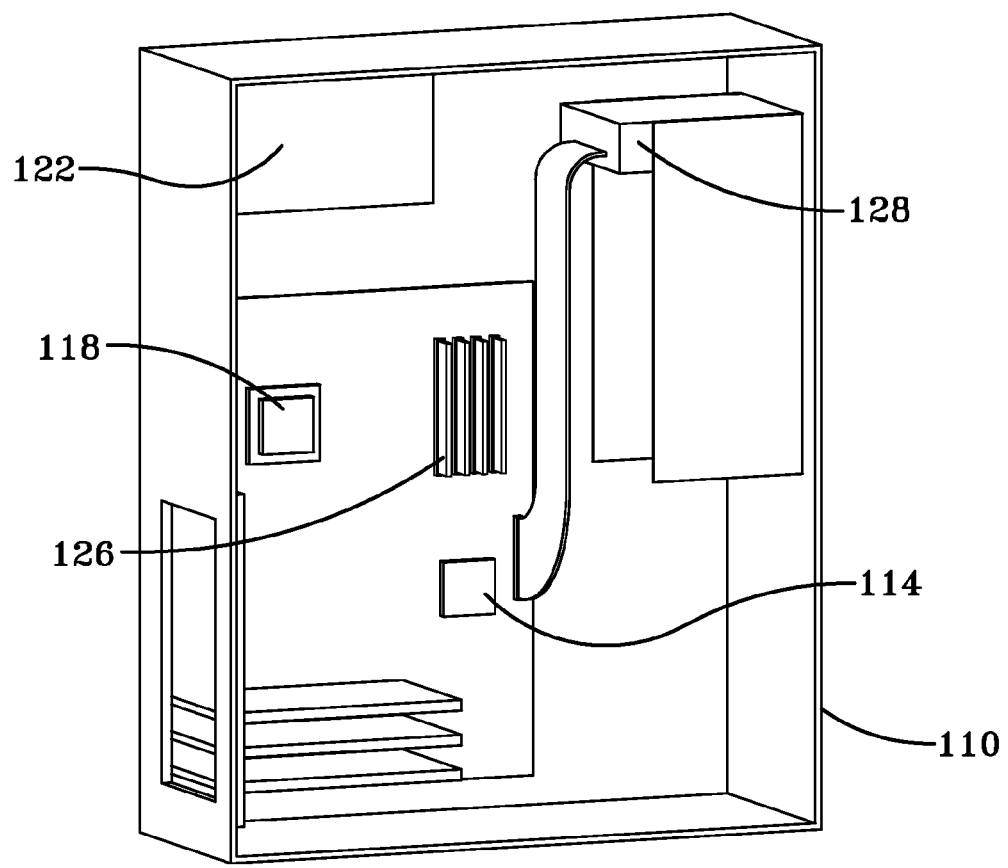
FIG. 4 is an exemplary embodiment of a remote electronic computing device equipped with self-cannibalizing software.

FIG. 4 is an exemplary embodiment of a remote electronic computing device 110 equipped with self-cannibalizing software. In this exemplary embodiment, the remote electronic computing device 110 is a computer. The self-cannibalizing software is stored as a program on the computer's hard disk 128. The self-cannibalizing software program exists on the hard disk 128 as bytes of information which the hard disk 128 is capable of electronically communicating to the computer's microprocessor 118. When the power source 122 is activated and the computer is powered up, the computer's microprocessor 118 communicates with the hard disk 128 to receive the self-cannibalizing software program. The hard disk 128 responds to the signal by sending the self-cannibalizing software program to the microprocessor 118. The self-cannibalizing software program may be stored in the computer's random access memory 126 while it is being processed by the microprocessor 118. In one exemplary embodiment, the microprocessor 118 is simultaneously running a date and time program which provides the microprocessor 118 with a current time value. The self-cannibalizing software program instructs the microprocessor 118 to compare the current time value with a preset expiration time value which is supplied by the self-cannibalizing software program. The self-cannibalizing software program instructs the microprocessor to send a request signal to the hard disk 128 when the preset expiration time value equals the current time value. The request signal instructs the hard disk 128 to send a security mechanism file to the microprocessor 118. The hard disk 128 responds to the request signal by sending the security mechanism file to the microprocessor 118. The security mechanism file may be a collection of bytes that instruct the microprocessor as to how to execute the security mechanism. In one exemplary embodiment, the security mechanism file instructs the microprocessor 118 to send an electronic signal to the chipset 114. The electronic signal interferes with the ability of the chipset 114 to direct the flow of information from one point to another within the computer. In an exemplary embodiment, the interruption in the flow of information within the computer prevents electronic data stored on the hard disk 128 from being accessed.

In an exemplary embodiment the remote electronic computing device 110 is a computer such as shown in FIG. 4 and the host electronic computing device 100 is also a computer. In this exemplary embodiment, the remote computer 110 is capable of accessing the internet and through the internet is able to log into the host computer 100. If the remote computer 110 logs into the host computer 100 before the self-cannibalizing software of the remote computer 100 has caused the launch of a security mechanism, the complimentary administrative software on the host computer 100 will identify the remote computer 110 using the remote computer's IP address, or some other identifier. Once the remote computer 110 has been identified by the host computer 100 the host 100 will access the remote computer's expiration time reset schedule. The expiration time reset schedule may be stored as bytes in a disk drive somewhere on the host computer 100, but may also be saved elsewhere and in a different form. The complimentary administrative software of the host computer 100 processes the expiration time reset schedule for the remote computer 110 and sends a signal to the remote computer 110. The signal is an electronic instruction that the self-cannibalizing software on the remote computer 110 will use to properly reset its expiration time. In an exemplary embodiment, the remote computer 110 receives the signal as a string of bytes over the internet connection. When the bytes are received by the remote computer 110 they are sent to the microprocessor 118. The microprocessor 118 uses the bytes of the signal to alter the expiration time value of the self-cannibalizing software. The altered expiration time value now controls when the security mechanism is set to be launched by the self cannibalizing software of the remote computer 110.

In another exemplary embodiment, the remote electronic computing device 110 is a computer comprising self-cannibalizing software, a Secure Erase command, and Secure Erase effectuating software. The Secure Erase command is a security feature that has been built into virtually all P/SATA drives built since 2001—since it became part of the ATA standard. Secure Erase is a federally approved (NIST 800-88) in-drive command for data sanitization. When the Secure Erase command is effectuated within a computer, it causes the permanent deletion of electronic files stored within the computer. In this exemplary embodiment, the Secure Erase command is the security mechanism of the disclosed system and method. The effectuating software overcomes any barriers to the operation of the Secure Erase command which might have been installed on the computer. An example of Secure Erase command effectuating software is the Freeware Secure Erase Utility, HDDErase.exe, which may be downloaded at the website for the Center for Magnetic Recording Research. The self-cannibalizing software may cause the launch of the Secure Erase command by providing an instruction to the microprocessor of the computer when its expiration time is reached. In response to the instruction, the microprocessor may send a message to the disk drive which causes the Secure Erase command effectuating software to be run which in turn activates the Secure Erase command. In another exemplary embodiment there is no need for Secure Erase command effectuating software and the self-cannibalizing software may cause the launch of the Secure Erase command by sending an instruction to the microprocessor directing it to launch the Secure Erase command. In another exemplary embodiment, the remote electronic computing device 110 is a computer comprising self-cannibalizing software and additional software stored on the computer's disk drive. In this embodiment, the additional software supplies the system's security mechanism. For example, the additional software may be VCOM® SECURERASE™, but other software programs may also be used. When the expiration time has been reached, the self-cannibalizing software instructs the remote computer's microprocessor to run VCOM® SECURERASE™. VCOM® SECURERASE™ causes the disk of a portable computing device to be wiped clean by overwriting its data to make it unrecoverable. VCOM® SECURERASE™ may be purchased online at www.v-com.com. Additional examples of software that may be implemented by the current system and method as the system's security mechanism are Aevita Wipe & Delete produced by Aevita Software Ltd. and available for purchase at www.aevita.com, East-Tec Eraser produced by East Technologies and available for purchase at www.amazon.com, and the ANONYMIZER® DIGITAL SHREDDER™ by ANONYMIZER® available for purchase online at YAHOO!® Shopping.

In an exemplary embodiment, regardless of how the security mechanism renders electronic data stored on a remote electronic computing device 110 inaccessible, etc. the security mechanism is capable of extending and applying itself to electronic data files contained on any readable and writable external storage device that may be attached to the remote electronic computing device 110 when the security mechanism is triggered. Readable and Writable external storage devices include disks, diskettes, zip drives, CDs, DVDs, DRDs, etc. In an exemplary embodiment, when the security mechanism of self-cannibalizing software is automatically applied to a readable/writable external storage device it causes the deletion or corruption of electronic data files.

In another exemplary embodiment, the complimentary administrative software of the host electronic computing device 100 contains program source code enabling it to identify and inventory specific remote electronic computing devices 110 as they log into, synch up with, or access the host electronic computing device 100 in order to reset the expiration time of the self-cannibalizing software stored on the remote electronic devices 110. This may enable the administrator of the host electronic computing device 100 to accurately account for the remote electronic computing devices 110 in the electronic computing device system supported by the host electronic computing device 100.

In another exemplary embodiment, the complimentary administrative software of the host electronic computing device 100 contains program source code capable of searching or browsing through the electronic data files of a remote electronic computing device 110 equipped with self-cannibalizing software that has logged into, synched up with, or accessed the host electronic computing device 100 for specific electronic data files stored on the remote electronic computing device 110 as identified by file names, specific words, number, data or other identifying characteristics and extracting a copy of such selected electronic data files. This may enable the administrator of the host electronic computing device 100 to secure information contained in electronic data files stored on the remote electronic computing device 110 that may be required by the host electronic computing device administrator. For example, a host electronic computing device 100 may utilize source code to search through the electronic data stored on a remote electronic computing device 110 that has logged into, synched up with, or accessed the host electronic computing device 100 in order to secure copies of documents that must be produced as part of a system wide document production request in connection with the legal discovery mandated by upcoming litigation.

In another exemplary embodiment, the complimentary administrative software of the host electronic computing device 100 contains program source code capable of searching or browsing the electronic data files of a remote electronic computing device 110 equipped with self-cannibalizing software that has logged into, synched up with, or accessed the host electronic computing device 100 for specific electronic data files stored on the remote electronic computing device 110 as identified by file names, specific words, number, data, or other identifying characteristics, extracting a copy of such identified electronic data files, and triggering the self-cannibalizing software on the remote electronic computing device 110 to quarantine such selected electronic data files for later retrieval or verification, if necessary. This may enable the administrator of the host electronic computing device 100 to secure information stored in electronic data files contained on remote electronic computing devices 110 that may be required by the host electronic computing device administrator, for example in the case of a system wide document production request in connection with legal discovery in the context of litigation.

Any embodiment of the disclosed system and method may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for using a host electronic computing device to monitor data stored in an electronic computing device remote from the host electronic computing device, each of the electronic computing devices adapted for selective electronic communication with the other, comprising the steps of:
    providing a self-cannibalizing software program for the remote device, the self-cannibalizing software program comprising a unique identifier, a current expiration time value, a comparator for comparing the current expiration time value against a time-based parameter of the remote device, and a security trigger configured to be activated by the self-cannibalizing software at a preset time;
    providing a second software program for the host device, the second software program comprising an identifier and an expiration time reset schedule, including at least a day of the week list, which is stored at the host device and configured to control when the expiration time of the self-cannibalizing software must be reset in order to prevent an automatic launch of the security trigger at the remote device;
    the second software program allowing the host device to search through data stored on the remote electronic computing device such that the system is adapted to be used to, at least, secure copies of documents to be produced as part of a system document production request;
    identifying the remote device via the unique identifier; and
    monitoring the data stored in the remote device.

2. The method of claim 1, further comprising the step of:
    inventorying the remote electronic device by comparing the remote device to one or more other remote devices.

3. The method of claim 1, wherein the step of monitoring the data stored in the remote device includes the substeps of:
    searching the data stored in the remote device for electronic data files based on a particular search criteria; and
    identifying an electronic data file based on the search and extracting a copy of the identified electronic data file to the host device.

4. The method of claim 3, wherein the search criteria used for the data searching step targets deleted electronic data files.

5. The method of claim 1, wherein the data monitoring step includes the substep of:
    extracting data stored in the remote device and storing the extracted data at the host device when the remote device is in electronic communication with the host device.

6. The method of claim 1, wherein the data monitoring step includes the substep of:
    quarantining electronic data files stored on the remote device so that they are unrecoverable by a user of the remote device.

7. The method of claim 6, wherein the step of quarantining electronic data files prevents a user of the remote device from altering the quarantined electronic data files.

8. The method of claim 6, wherein the step of quarantining electronic data files prevents a user of the remote device from transferring the quarantined electronic data files to another computing device.

9. The method of claim 6, wherein the step of quarantining electronic data files prevents a user of the remote device from deleting the quarantined electronic data files.

10. The method of claim 6, further comprising the step of:
    allowing the host device to access quarantined files in the remote device.

11. A system for using a host electronic computing device to prevent access to data in a preselected memory portion of an electronic computing device remote from the host electronic computing device, each of the electronic computing devices adapted for selective electronic communication with the other, comprising:
    a first software program for the remote device, the first software program comprising a unique identifier, a current expiration time value, a comparator for comparing the current expiration time value against a time-based parameter of the remote device, and a security trigger; and
    a second software program for the host device, where the second software program comprises:
    means for identifying the remote device;
    means for accessing an expiration time reset schedule;
    means for resetting the current expiration time value; and
    means for searching through data stored on the remote device and monitoring the data stored in the remote device.

12. The system of claim 11 wherein:
    the second software program further comprises a means for inventorying the remote device.

13. The system of claim 11 wherein:
    the second software program further comprises means for searching the data stored in the remote device for electronic data files based on search criteria.

14. The system of claim 13 wherein:
    the second software program further comprises means for identifying electronic data files based on the search criteria.

15. The system of claim 14 wherein:
    the search criteria used targets deleted data files.

16. The system of claim 11 wherein:
    the means for monitoring allows data stored in the remote device to be extracted and stored in the host device.

17. The system of claim 11 wherein:
    the means for monitoring allows data stored in the remote device to be quarantined.

18. A system for using a host electronic computing device to prevent access to data in a preselected memory portion of an electronic computing device remote from the host electronic computing device, each of the electronic computing devices adapted for selective electronic communication with the other, comprising:
    a self-cannibalizing software program for the remote device, the self-cannibalizing software program comprising a unique identifier, a current expiration time value, a comparator for comparing the current expiration time value against a time-based parameter of the remote device, and a security trigger configured to be activated by the self-cannibalizing software, said security trigger able to cause a security mechanism to be activated that can disable data on the remote device; and
    a second software program for the host device, where the second software program comprises:
    means for identifying the remote device via the unique identifier; and
    means for reversing the disablement of data on the remote device caused by the security mechanism that has disabled said data on the remote device.

19. The system of claim 18, wherein the disablement of data on the remote device occurs through the activation of the self-cannibalizing software at a preset expiration time.

20. The system of claim 19, wherein the second software program further comprises means for inducing the disablement of data when the host device is in electronic communication with the remote device.

\* \* \* \* \*